Figures 1, 2:
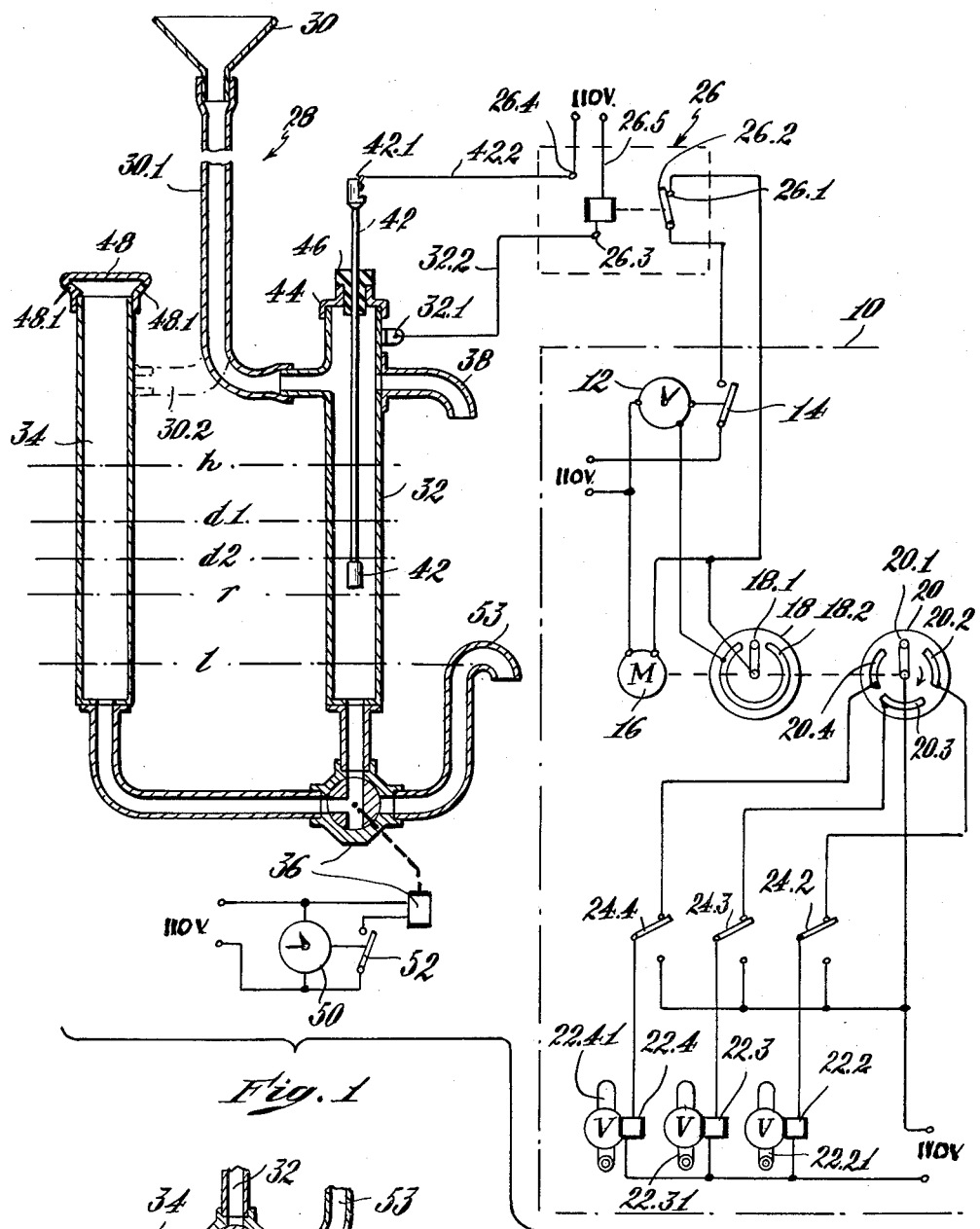

INVENTOR.
Austin S. Norcross

United States Patent Office 2,991,938
Patented July 11, 1961

2,991,938
AUTOMATIC IRRIGATION SYSTEM
Austin S. Norcross, Newton, Mass.
Filed Oct. 12, 1959, Ser. No. 845,925
9 Claims. (Cl. 239—64)

The field of this invention is that of irrigation systems, and the invention relates more particularly to irrigation systems which are adapted to operate automatically without supervision.

In order to furnish proper irrigation, an automatic irrigation system must be adapted to provide a substantial amount of water at spaced intervals so that the soil will be moistened to a substantial depth for encouraging the growth of deep roots. Further the system must be capable of regulation so that irrigation will be effected only during predetermined periods whereby irrigation can be coordinated with other activities in the irrigated area and whereby the hours of the day can be selected in which maximum ground absorption of the water provided by the system will occur. In addition, the system must be adapted automatically to regulate the amount of water supplied by the system in accordance with rain fall so that water will not be wasted and so that crops or lawns will not be subjected to excessive watering. Finally an irrigation system must be inexpensive and reliable in order to provide economical irrigation for valuable crops or lawns.

In the past, various proposed automatic irrigation systems have provided irrigation at intervals without regard to the amount of rainfall in a relevant period or have included expensive and unreliable means, such as electronic tubes and ground-moisture detecting electrodes, intended to regulate the systems indirectly in accordance with rainfall. Some of these systems waste water and sometimes subject crops or lawns to harmful, excessive watering, and others are so expensive to operate or so unreliable over long periods of operation that they have proven impractical.

Objects of this invention are to provide a simple and reliable automatic irrigation system which can be inexpensively constructed, installed and operated; to provide such a system which can be regulated to provide a substantial amount of water at spaced intervals; to provide such a system in which irrigation will be effected only at predetermined times of the day; to provide an automatic irrigation system which will not waste water and which will not subject crops or lawns to excessive watering; to provide such a system which will automatically regulate the amount of water supplied by the system in accordance with rainfall whether said rainfall is heavy or light or of short, long or periodically intermittent duration; and to provide such a system which can be utilized in cooperation with systems presently in use.

The nature and substance of irrigation systems according to the present invention can be shortly characterized as providing conventional installations of sprinkler pipes or canals having solenoid valves operated by timing motors and relays for controlling fluid flow therethrough, with rainfall-responsive control apparatus having rain-accumulating means and adapted to be energized automatically for a certain period following a rainfall in accordance with the amount of rain water accumulated by the accumulating means, in order to de-energize the motor circuit of the sprinkler system to prevent irrigation during that period. Thus relay energization in response to rainfall will cause the system to omit one or more scheduled irrigation periods according to the amount of rainfall even though the timer continues to close the main switch at scheduled intervals. In an important aspect of the invention, means are provided for the purpose of additional regulation in case of excessively heavy rainfall with rapid run-off.

The rain-accumulating means are provided with a drain or discharge means which is adapted to dump or empty a portion of any rain water accumulated by said means at regular spaced intervals so that, when the level of the rain water accumulation has been sufficiently lowered after the proper period of time, the relay will be permitted to return to de-energized position.

In the preferred embodiment of this invention, the rain-accumulating means comprises a vertically disposed tube which is arranged to accumulate rainfall and to serve as an electrode, and a second electrode normally insulated therefrom which is extended a short distance into the tube. The electrodes are connected in series with the relay and with a power source so that, when rain water is accumulated in the electrode tube to a level sufficient to contact the second electrode, the relay will be energized from the power source through the accumulated rain water.

In the preferred embodiment of this invention, a second tube is included in the rain-accumulating means and is normally connected to the electrode tube through a solenoid valve so that each tube is adapted to receive a portion of the rain water accumulated. A second timer is provided which energizes said solenoid valve at regular intervals thereby to move the valve to a draining or discharging position where that part of the rain water accumulation which is accommodated in the second tube is drained off. During draining of said second tube, the accumulation in the electrode tube is temporarily prevented from passing into the second tube. Thereafter, when the solenoid valve returns to de-energized position, part of the rain water accumulation remaining in the electrode tube will pass into the second tube proportionately lowering the water level in the electrode tube. In this way, rain water accumulated during a light or heavy rainfall is gradually drained from the system, and it will be understood that the tube proportions and draining intervals can be interrelated to drain the rain water accumulation at a rate approximating the rate at which the irrigating effects of the respective rainfalls upon the irrigated area would be dissipated.

These and other objects and aspects of the nature of the invention will appear from the following description of a practical embodiment illustrating its novel characteristics.

The description refers to a drawing in which

FIG. 1 is a diagrammatic view of the apparatus which shows the structure of the rain-accumulating means in vertical section and which shows in schematic form the electrical circuitry cooperative therewith; and FIG. 2 is a section view of the solenoid drain valve in draining position.

Referring to the drawings, the broken line 10 in FIG. 1 encloses the portion of that figure which schematically illustrates the conventional means incorporated in this system for regulating the system normally to provide irrigation at predetermined intervals. The system is preferably operated from a 110 volt-60 cycle power source. In order to simplify the drawings, the power source is here indicated only by terminals marked with the legend "110V." and it will be understood that the terminals are connected by lines to the power source in conventional manner.

In the system provided by this invention an electrical timer 12 is energized from the power source and is adapted to close a main switch 14 at scheduled intervals. Since such a timer is well known, it will be understood without further description that the timer rotor can be provided with appropriate actuating pins (not shown)

for closing the main switch 14 at intervals of a few hours, a day, or several days and that the timer can be adapted to close the main switch at regular or irregular intervals.

Closing of the main switch 14 energizes a motor 16 which in turn operates a pair of rotary switches 18 and 20, the switch 18 closing contacts 18.1 and 18.2 as the motor begins operation for locking the motor in energized condition for the proper period of time. In this construction the main switch 14 need be closed for only a few seconds and yet the motor, once energized, will perform the desired number of revolutions without interruption.

Operation of the rotary switch 20 rotates the switch arm 20.1 for closing a circuit for a fixed period of time through each of the contacts 20.2, 20.3, and 20.4 in sequence, thereby to energize the solenoid valves, 22.2, 22.3 and 22.4, respectively, from the power source in the same sequence. As each solenoid valve is energized, water is permitted to flow through a section of a network of sprinkler pipes or irrigating canals (indicated at 22.41, 22.31 and 22.21, respectively) in conventional manner. Energization of the valves in sequence assures that satisfactory water pressure is available for effecting proper irrigation in each section of the area irrigated by the system.

Preferably, but not necessarily, manually operable, single pole-double throw switches, 24.2, 24.3 and 24.4 respectively, are interposed in the solenoid valve circuits and provide an alternative circuit from the power source through the respective valve solenoids whereby the system can be manually operated to provide irrigation when desired.

It should be understood that although specific means commonly used for providing irrigation at intervals has been described above for the purpose of illustration, any broadly comparable means for providing irrigation at intervals is within the scope of this invention.

In accordance with this invention, the main switch 14 and the motor 16 are connected in series through normally closed contacts 26.1 and 26.2 of a relay 26, and a rain-accumulating means 28 is provided for energizing the relay in response to rainfall to open the motor circuit and to keep it open for the proper period of time, in the following manner.

The rain-accumulating means comprises an open-faced member such as a funnel 30 which is appropriately sized and disposed to collect a measured proportion of any rain falling within the area to be irrigated and to conduct the rainwater collected through the conduit 30.1 to a pair of receiving vessels such as vertically disposed tubes 32 and 34. The tubes are normally interconnected at the lower end thereof through a three-way solenoid valve 36 as shown in FIG. 1 so that each tube is adapted to receive and accommodate a fixed proportion of the rain water collected by the funnel 30, the proportion being determined by the relative volume and configuration of the tubes. An overflow outlet 38 is provided at the top of one of the tubes for limiting the amount of rain water which can be accumulated therein. As shown in FIG. 1 the conduit 30.1 can be adapted to empty into the tube 32, as shown, or into the tube 34, as indicated by the dotted lines 30.2

The tube 32 is adapted to serve as an electrode and is connected by terminal 32.1 and lead wire 32.2 to a contact 26.3 on the relay. A second electrode is provided by a rod 42 extending a short distance into the electrode tube along the axis thereof and being connected by means of the terminal 42.1 and the lead wire 42.2 to a contact 26.4 on the relay. As shown, the contacts 26.4 and 26.5 of the relay are connected to the power source.

The second electrode 42 is supported by a cap 44 fitted over the top of the electrode tube and is normally insulated therefrom by means of a bushing 46 of rubber or similar material. Preferably the bushing provides a frictional grip on the second electrode whereby the extent to which said electrode extends into the electrode tube can be conveniently adjusted. However, the second electrode can be fixedly mounted or can be made adjustable in other ways within the scope of this invention. Preferably the tube 34 is also provided with a cap 48 having vent holes 48.1.

A second timer 50 is provided by this invention and is adapted to energize the three-way solenoid valve 36 from the power source through the switch 52, for short periods at predetermined, preferably regular, intervals, thereby to move the valve from the position shown in FIG. 1 to the position shown in FIG. 2 for said periods. In the position indicated in FIG. 2, the valve temporarily seals the electrode tube 32 to prevent passage of the rain water therein to the second tube and drains or dumps the rain water accumulation from the second tube 34 through the drainage outlet 53.

The operation of this device is as follows:

As thus constructed, the irrigation system will control the solenoid valves 22.2, 22.3 and 22.4 to provide a substantial amount of irrigation at intervals as regulated by the timer 12. However if rainfall occurs, the rain-accumulating means 28 will collect a proportion of said rainfall which is then accumulated in the tubes 32 and 34 in fixed proportion.

If the rainfall is heavy so that irrigation of the area served by the system would not be required for several days thereafter, the level of the rain water accumulation in the tubes 32 and 34 will be high, for example to the level indicated by line $h$ in FIG. 1. Therefore the accumulated rain water will contact the electrode 42 and will close a circuit between said electrode and the electrode tube 32 for energizing the relay 26 with normally closed contacts 26.1, 26.2. Thus the circuit through the valve controlling motor 16 will be opened causing the system to omit one or more scheduled irrigation periods so long as the water level remains above the lower end of the electrode 42, as indicated at $r$.

It should be understood that, although the tube 32 as here illustrated comprises an electrode and is provided with a second electrode 42 cooperable therewith for the purpose of energizing the relay 26 in response to rainfall, other means actuable in response to a specific amount of rain water in the tube 32 for energizing the relay 26 are within the scope of this invention. For example, a float could be disposed within the tube 32 and could be adapted by appropriate linkage to actuate a switch for energizing the relay 26 in response to accumulation of rain in the tube 32.

The timer 50 actuates the three-way solenoid valve 36 at predetermined, preferably regular, intervals for draining the rain water accumulation in the tube 34 (FIG. 2) and for thereafter permitting part of the remaining accumulation in the electrode tube 32 to flow into the tube 34. In this manner, the rain water accumulated during the above-mentioned heavy rainfall, for example, will be reduced to the level indicated by line $d1$ after one drainage interval, to the level indicated by line $d2$ after the second interval, and after the third interval it will be reduced to the level of line $r$ permitting de-energization of the relay 26 and resumption of irrigation at regular intervals. It will be understood that the tube volumes can be interrelated with the draining interval so that de-energization of the relay 26 is permitted to occur at the approximate time when the irrigating effect of the heavy rainfall has been dissipated. It will also be understood that the drainage outlet is preferably arranged at the level shown in FIG. 1 so that the accumulation in the tubes will not go below the level indicated by line $l$.

If a rainfall occurs which is excessively heavy so that the majority of the rainfall will rapidly run off the soil to be irrigated without substantially extending the period during which the irrigating effect of said rainfall will be significant, the rain water accumulated in the tubes 32 and 34 will overflow from the outlet 38. Thus, the system will in that event omit irrigation periods for a period only slightly longer than that following the normally heavy rainfall above described. It has been found that where rainfall over an extended period such as a year can be characterized as moderately high, for example, one-half inch of rain water accumulation might be required for energizing the relay 26 and the overflow tube might be located to limit the maximum possible accumulation to approximately two inches.

If a light rainfall occurs such as would have little irrigating effect, the rain water accumulation will not be sufficient to energize the relay 26 to omit a scheduled irrigation period and after an interval the small amount of rain water accumulated will be drained from the system by the timer relay 50. However, it will be understood that a series of such light rainfalls occurring closely together so that they would have a substantial irrigating effect would provide a correspondingly substantial rain water accumulation in the tubes 32 and 34 and would actuate the irrigation system to omit several irrigation periods as above described for normally heavy rainfall. On the other hand, a series of light rainfalls occurring at spaced intervals such as would have little effect on the irrigation requirements of the area served by this system, would provide far less accumulation in the tubes 32 and 34 as will be readily understood, and would actuate the system to omit, at the most, only a single scheduled irrigation period.

It should be understood that the present disclosure is for the purpose of illustration only and that this invention includes all modifications and equivalents which fall within the scope of the appended claims.

I claim:

1. In an automatic irrigation system capable of causing irrigation at predetermined intervals, means for automatically regulating irrigation provided by the system in accordance with rainfall, said means comprising: means actuable for interrupting the irrigation by said system; rain-accumulating means adapted to actuate said irrigation interrupting means in response to rainfall when a predetermined amount of rain water has been accumulated therein; and time controlled means for automatically discharging predeterminedly decreasing amounts of rain water from said accumulating means at predetermined spaced timed intervals and with said amounts of rain water so discharged being within each of said intervals in predetermined proportion to the amounts of rain water then remaining in said accumulating means for regulating the amount of rain water accumulated in accordance with the irrigation provided by said rainfall.

2. In an automatic irrigation system capable of causing irrigation at predetermined intervals, means for automatically regulating irrigation by the system in accordance with rainfall, said means comprising means actuable for interrupting irrigation by said system; rain-accumulating means adapted to actuate said irrigation-interrupting means in response to rainfall when a predetermined amount of rain water has been accumulated therein; and time controlled valve means adapted to open and close periodically for automatically dumping predeterminedly decreasing amounts of said rain water from said accumulating means, at predetermined time intervals and with said amounts of rain water so dumped being within each of said intervals in predetermined proportion to the amounts of rain water then remaining in said accumulating means for regulating the amount of rain water accumulated in accordance with the irrigation provided by said rainfall, said valve means including a water holding chamber and a valve for periodically connecting said rain accumulating means and said water holding chamber and for discharging, with the same periodicity but later in time, any water contained in said second water holding chamber.

3. In combination with an automatic irrigation system having means for closing an electrical circuit at predetermined intervals to cause irrigation at said intervals, means for automatically regulating irrigation provided by the system in accordance with rainfall, said regulating means comprising: electrical contact means adapted to open said circuit when actuated; rain-accumulating means adapted to actuate said contact means in response to rainfall when a predetermined amount of rain water has been accumulated therein; and time controlled means for automatically dumping predeterminedly decreasing amounts of rain water from said accumulating means, at predetermined timed intervals and with said amounts of rain water so dumped being within each of said intervals in fixed predetermined proportion to the amounts of rain water then remaining in said accumulating means for regulating the amount of rain water accumulated in accordance with the irrigation provided by said rainfall.

4. In combination with an automatic irrigation system having means for closing an electrical circuit at predetermined intervals for providing irrigation at said intervals, means for automatically regulating irrigation provided by said system in accordance with rainfall, said regulating means comprising: electrical contact means adapted to open said circuit when actuated; rain-accumulating means having two chambers for accommodating the rain water accumulated by said means, said chambers being normally interconnected so that each chamber accommodates a proportion of said rain water accumulation, said accumulating means having means for actuating said contact means in response to rainfall when sufficient rain water is accumulated in one of said chambers; and valve means for disconnecting said chambers and for discharging the rain water accommodated in said other chamber at predetermined spaced intervals for regulating the amount of rain water accumulated in said one chamber in accordance with the irrigation provided by said rainfall.

5. In an automatic irrigation system according to claim 4, overflow means in at least one chamber of said rain-accumulating means for limiting the amount of rain water which can be accumulated by said means.

6. In an irrigation system having a network of conduits for supplying water to an area to be irrigated, automatic irrigation control means comprising: solenoid valves actuable to permit water flow through said conduits; electric timer means for actuating said valves at intervals; a relay adapted to prevent actuation of said valves when said relay is energized; means for accumulating a proportion of any rainfall occurring in said area to be irrigated, said means including two chambers which are normally interconnected through a three way solenoid valve so that each chamber is adapted to accommodate a proportionate amount of said rain water accumulation; a pair of electrodes associated with one of said chambers which are adapted to be interconnected electrically for energizing said relay in response to rainfall when said rain water accumulation in said chamber is sufficient to contact both of said electrodes; and electric timer means for energizing said three-way solenoid valve at predetermined intervals for draining one of said chambers, thereby to drain a proportionate amount of said rain water accumulated at said intervals.

7. Automatic irrigation control means according to claim 6 wherein at least one of said chambers in the rain-accumulating means is provided with an overflow outlet tube for limiting the amount of rain water which can be accommodated in said chambers.

8. In an irrigation system having a network of conduits for supplying water to an area to be irrigated, automatic irrigation control means comprising: solenoid valves actuable to permit water to flow through said conduits; electric timer means for actuating said valves at intervals; electrical contact means adapted to prevent actuation of said solenoid valves; means for accumulating a proportion of any rainfall occurring in said area to be irrigated, said means including two chambers which are normally interconnected through a three-way solenoid valve so that each chamber is adapted to accommodate a proportionate amount of said rain water accumulation; means associated with one of said chambers for regulating said contact means to prevent actuation of said solenoid valves when said rain water accumulation in said one chamber is above a predetermined level; and an electrical timer means for energizing said three-way solenoid valve at predetermined intervals for draining one of said chambers thereby to drain a proportionate amount of said accumulated rain water at said intervals.

9. Automatic irrigation control means according to claim 8 wherein at least one of said chambers in the rain accumulating means is provided with an overflow outlet tube for limiting the amount of rain water which can be accommodated in said chambers.

References Cited in the file of this patent
UNITED STATES PATENTS

| | | |
|---|---|---|
| 2,776,860 | Griffis | Jan. 8, 1957 |
| 2,875,428 | Griswold | Feb. 24, 1959 |